(12) United States Patent
Senoo

(10) Patent No.: US 10,416,618 B2
(45) Date of Patent: Sep. 17, 2019

(54) MACHINE LEARNING APPARATUS FOR LEARNING GAIN OPTIMIZATION, MOTOR CONTROL APPARATUS EQUIPPED WITH MACHINE LEARNING APPARATUS, AND MACHINE LEARNING METHOD

(71) Applicant: FANUC CORPORATION, Yamanashi (JP)

(72) Inventor: Tatsuya Senoo, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 305 days.

(21) Appl. No.: 15/222,948

(22) Filed: Jul. 29, 2016

(65) Prior Publication Data

US 2017/0032282 A1 Feb. 2, 2017

(30) Foreign Application Priority Data

Jul. 31, 2015 (JP) .................................. 2015-152453

(51) Int. Cl.

| | |
|---|---|
| *G06N 3/08* | (2006.01) |
| *G06N 3/063* | (2006.01) |
| *G06N 20/00* | (2019.01) |
| *G05B 13/02* | (2006.01) |
| *G05B 11/42* | (2006.01) |
| *G06N 3/00* | (2006.01) |

(Continued)

(52) U.S. Cl.
CPC .......... *G05B 13/0265* (2013.01); *G05B 11/42* (2013.01); *G06N 3/006* (2013.01); *G06N 7/005* (2013.01); *G06N 20/00* (2019.01); *G06N 3/02* (2013.01); *G06N 3/08* (2013.01)

(58) Field of Classification Search
CPC .... G05B 13/00; G06B 13/0265; G06B 11/42; G06N 20/00; G06N 3/006; G06N 7/005; G06N 3/02
USPC ...................................................... 706/25, 12
See application file for complete search history.

(56) References Cited

U.S. PATENT DOCUMENTS

| | | | |
|---|---|---|---|
| 8,542,708 B1 * | 9/2013 | Mok ...................... | H04J 3/0685 370/503 |
| 8,897,919 B2 * | 11/2014 | Sato ........................ | B25J 9/1633 700/1 |

(Continued)

FOREIGN PATENT DOCUMENTS

| | | |
|---|---|---|
| CN | 1431769 A | 7/2003 |
| CN | 1527170 A | 9/2004 |

(Continued)

*Primary Examiner* — Ly D Pham
(74) *Attorney, Agent, or Firm* — Hauptman Ham, LLP

(57) ABSTRACT

A machine learning apparatus according to one embodiment of the present invention is a machine learning apparatus for learning a condition associated with adjustment of a current gain parameter in electrical machine control, and comprises: a state observing unit which acquires actual current as well as an integral gain function and a proportional gain function in a current control loop, and observes state variables which include the integral gain function, the proportional gain function, and at least one of an amount of overshoot, an amount of undershoot, and a rise time of the actual current occurring in response to a step-like torque command; and a learning unit which learns the condition associated with the adjustment of the current gain parameter in accordance with a training data set constructed from the state variables.

24 Claims, 5 Drawing Sheets

(51) Int. Cl.
*G06N 7/00* (2006.01)
*G06N 3/02* (2006.01)

(56) References Cited

U.S. PATENT DOCUMENTS

| | | | | |
|---|---|---|---|---|
| 9,019,997 B1 * | 4/2015 | Mok | ............ | H04B 10/07 |
| | | | | 370/503 |
| 9,310,799 B2 * | 4/2016 | Takeuchi | ............ | G05B 19/4155 |
| 9,488,965 B2 * | 11/2016 | Sekine | ............ | G05B 11/26 |
| 2011/0276180 A1 * | 11/2011 | Seem | ............ | F25B 49/027 |
| | | | | 700/275 |

FOREIGN PATENT DOCUMENTS

| | | |
|---|---|---|
| JP | 2-253303 A | 10/1990 |
| JP | 4-123102 A | 4/1992 |
| JP | 6-335279 A | 12/1994 |
| JP | 11-252964 A | 9/1999 |
| JP | 2000-184785 A | 6/2000 |
| JP | 2004-126656 A | 4/2004 |
| JP | 2007-164406 A | 6/2007 |
| JP | 2008-293192 A | 12/2008 |
| JP | 2012-10488 A | 1/2012 |
| JP | 2012-208789 A | 10/2012 |
| JP | 2014-178853 A | 9/2014 |

* cited by examiner

MACHINE LEARNING APPARATUS FOR LEARNING GAIN OPTIMIZATION, MOTOR CONTROL APPARATUS EQUIPPED WITH MACHINE LEARNING APPARATUS, AND MACHINE LEARNING METHOD

RELATED APPLICATIONS

The present application claims priority to Japanese Patent Application Number 2015-152453 filed Jul. 31, 2015, the disclosure of which is hereby incorporated by reference herein in its entirety.

BACKGROUND OF THE INVENTION

1. Field of the Invention

The present invention relates to a machine learning apparatus, a motor control apparatus, and a machine learning method, and in particular to a machine learning apparatus for learning optimization of a current gain parameter in electrical machine control, a motor control apparatus equipped with such a machine learning apparatus, and a machine learning method for the same.

2. Description of the Related Art

PI (proportional-integral) control is a current control system known for use in variable speed control of a motor using an inverter; in PI control, control is performed based on two control terms, a proportional gain function and an integral gain function (for example, refer to Japanese Unexamined Patent Publication No. 2000-184785, hereinafter cited as "patent document 1").

The current control gain adjustment method disclosed in patent document 1 is a method for adjusting the proportional gain in PI control; more specifically, the method measures the delay phase or delay time of a current detection signal waveform by comparing the current detection signal waveform with a single-phase AC current command signal, determines whether or not the detected delay is larger than a predetermined target delay phase or delay time, and makes an adjustment so as to increase the proportional gain when the detected delay is larger and decrease the proportional gain when the detected delay is smaller.

In the conventional art, a proper current gain parameter is set by calculating it from a physical constant or the like. Further, the conventional art has involved a certain degree of discrepancy (error) between the optimum value and the calculated value because, for example, the inductance varies due to the current. As a result, a human operator has had to make a fine adjustment by observing a step response or frequency response while varying the parameter.

It is therefore hard to say that such a conventional art method is optimum, and also the conventional art has had the problem that the adjustment takes time and trouble (labor). Furthermore, since the motor physical constant differs from one motor to another, the truly optimum parameter also differs from one motor to another, and hence the problem that optimizing the parameter for each individual motor takes even more time and labor and is therefore not realistic.

SUMMARY OF THE INVENTION

It is an object of the present invention to provide a machine learning apparatus that can improve motor response, reduce unevenness in feed, and enhance accuracy by optimizing a current gain parameter through machine learning; it is also an object of the invention to provide a motor control apparatus equipped with such a machine learning apparatus, and a machine learning method for the same.

A machine learning apparatus according to one embodiment of the present invention is a machine learning apparatus for learning a condition associated with adjustment of a current gain parameter in electrical machine control, and comprises: a state observing unit which acquires actual current as well as an integral gain function and a proportional gain function in a current control loop, and observes state variables which include the integral gain function, the proportional gain function, and at least one of an amount of overshoot, an amount of undershoot, and a rise time of the actual current occurring in response to a step-like torque command; and a learning unit which learns the condition associated with the adjustment of the current gain parameter in accordance with a training data set constructed from the state variables.

A machine learning apparatus according to an alternative embodiment of the present invention is a machine learning apparatus for learning a condition associated with adjustment of a current gain parameter in electrical machine control, and comprises: a state observing unit which acquires actual current as well as an integral gain function and a proportional gain function in a current control loop, and observes state variables which include the integral gain function, the proportional gain function, and at least one of bandwidth times calculated from an amplitude ratio and an amount of phase delay of the actual current occurring in response to a torque command constructed from a set of sinusoidal waves of different frequencies; and a learning unit which learns the condition associated with the adjustment of the current gain parameter in accordance with a training data set constructed from the state variables.

An electrical machine control apparatus according to one embodiment of the present invention is a motor control apparatus comprising the above-described machine learning apparatus and a motor controller, wherein the motor controller includes a torque command input unit which inputs a torque command, and the machine learning apparatus further includes a decision making unit which makes a decision to change the integral gain function and the proportional gain function in response to an input of a present state variable, based on a result of the learning that the learning unit performed in accordance with the training data set.

A machine learning method according to one embodiment of the present invention is a machine learning method for learning a condition associated with adjustment of a current gain parameter in electrical machine control, and comprises: acquiring actual current as well as an integral gain function and a proportional gain function in a current control loop, and observing state variables which include the integral gain function, the proportional gain function, and at least one of an amount of overshoot, an amount of undershoot, and a rise time of the actual current occurring in response to a step-like torque command; and learning the condition associated with the adjustment of the current gain parameter in accordance with a training data set constructed from the state variables.

A machine learning method according to an alternative embodiment of the present invention is a machine learning method for learning a condition associated with adjustment of a current gain parameter in electrical machine control, and comprises: acquiring actual current as well as an integral gain function and a proportional gain function in a current control loop, and observing state variables which include the integral gain function, the proportional gain function, and at least one of bandwidth times calculated from an amplitude ratio and an amount of phase delay of the actual current occurring in response to a torque command constructed from a set of sinusoidal waves of different frequencies; and learning the condition associated with the adjustment of the current gain parameter in accordance with a training data set constructed from the state variables.

BRIEF DESCRIPTION OF THE DRAWINGS

The above and other objects, features, and advantages of the present invention will become more apparent from the description of the preferred embodiments as set forth below with reference to the accompanying drawings, wherein.

DETAILED DESCRIPTION

A machine learning apparatus, a motor control apparatus, and a machine learning method according to the present invention will be described below with reference to the drawings.

Figure 1:
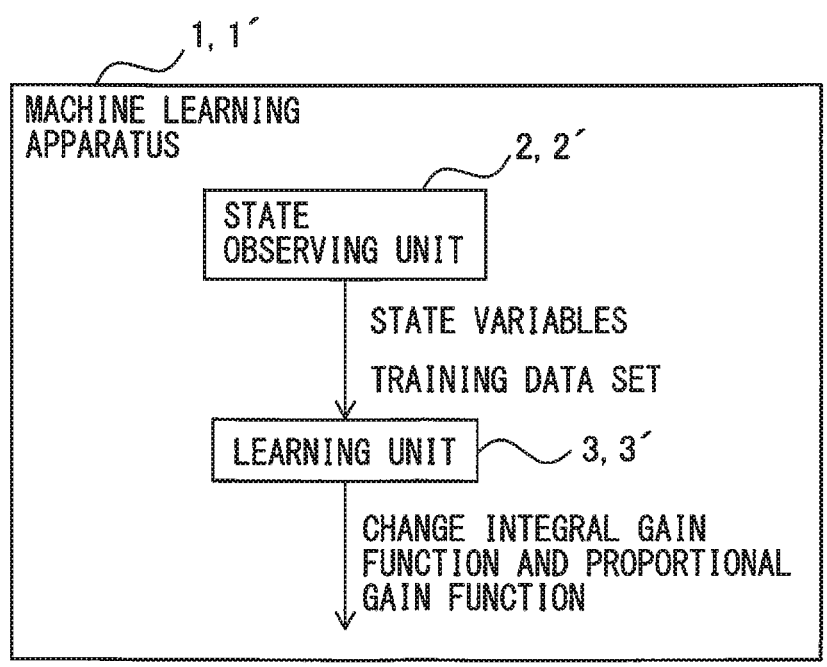
FIG. 1 is a diagram showing the configuration of a machine learning apparatus according to an embodiment of the present invention.
Figure 3:
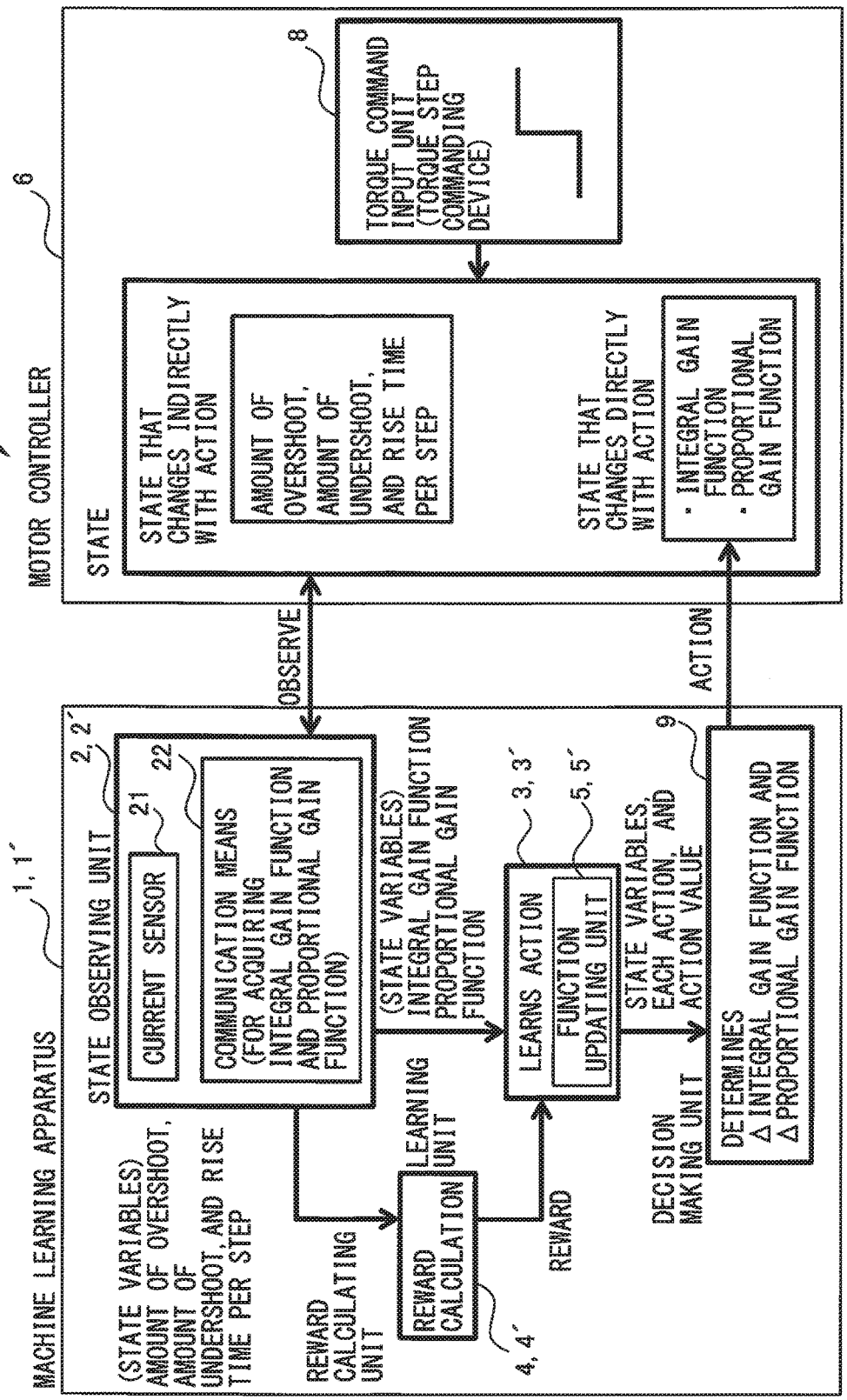
FIG. 3 is a diagram showing the configuration of a motor control apparatus according to an embodiment of the present invention.

FIG. 1 is a diagram showing the configuration of a machine learning apparatus according to an embodiment of the present invention. FIG. 3 is a diagram showing the configuration of a motor control apparatus according to an embodiment of the present invention.

The machine learning apparatus 1 according to the embodiment of the present invention learns the conditions associated with the adjustment of current gain parameters in electrical machine control, and comprises a state observing unit 2 and a learning unit 3.

The state observing unit 2 acquires actual current as well as an integral gain function and a proportional gain function in a current control loop, and observes state variables which include the integral gain function, the proportional gain function, and at least one of the amount of overshoot, the amount of undershoot, and the rise time of the actual current occurring in response to a step-like torque command.

The learning unit 3 learns the conditions associated with the adjustment of the current gain parameters in accordance with a training data set constructed from the state variables.

The machine learning apparatus 1 according to the embodiment of the present invention optimizes the current gain parameters (integral gain and proportional gain) in electrical machine control through machine learning (reinforcement learning). Since the optimum integral gain and proportional gain differ depending on the torque command, it follows that the apparatus optimizes the integral gain function and the proportional gain function with the torque command as their argument.

A machine learning apparatus 1' according to an alternative embodiment of the present invention learns the conditions associated with the adjustment of current gain parameters in electrical machine control, and comprises a state observing unit 2' and a learning unit 3'.

The machine learning apparatus 1 according to the embodiment of the present invention uses a step response, but since the same thing can be done using a frequency response, the overshoot and the rise time can be replaced with the output/input amplitude ratio and bandwidth. Therefore, in the machine learning apparatus 1' according to the alternative embodiment of the present invention, the state observing unit 2' acquires actual current as well as an integral gain function and a proportional gain function in a current control loop, and observes state variables which include the integral gain function, the proportional gain function, and at least one of bandwidth times calculated from the amplitude ratio and the amount of phase delay of the actual current occurring in response to a torque command constructed from a set of sinusoidal waves of different frequencies.

The learning unit 3' learns the conditions associated with the adjustment of the current gain parameters in accordance with a training data set constructed from the state variables.

The training data set that the learning unit 3, 3' uses for learning is not limited to the one acquired for one electrical machine. That is, the learning unit 3, 3' may be configured to learn the conditions in accordance with a training data set acquired for a plurality of electrical machines.

Figure 2A:
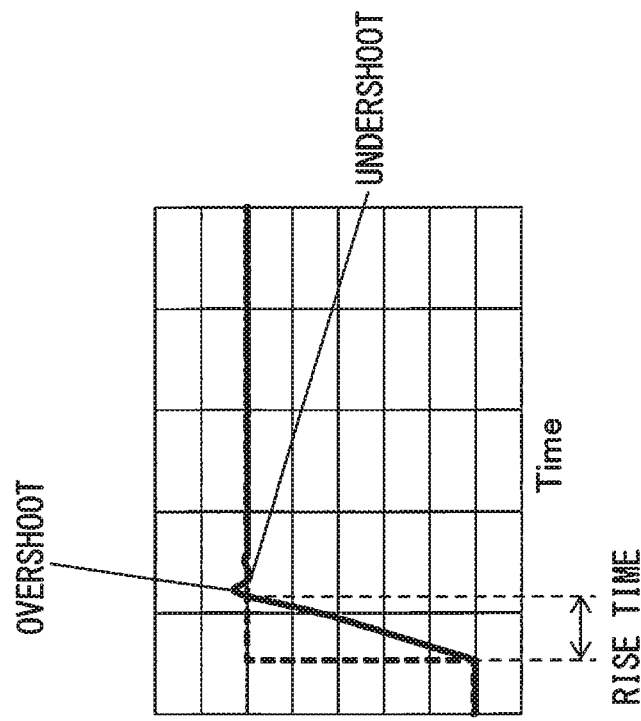
FIG. 2A is a graph depicting a temporal variation of current when current gain is not adjusted.
Figure 2B:
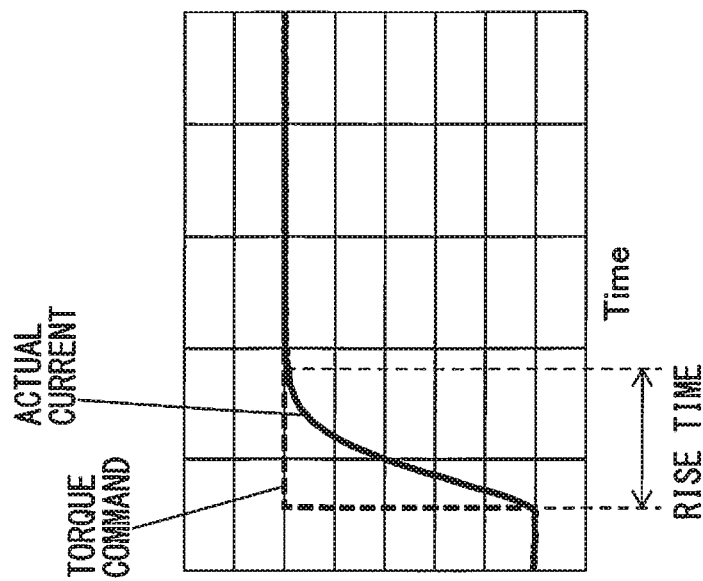
FIG. 2B is a graph depicting a temporal variation of current when current gain is adjusted.

Preferably, the machine learning apparatus 1 according to the embodiment of the present invention further comprises a reward calculating unit 4 which calculates a reward based on the amount of overshoot, the amount of undershoot, and the rise time selected from among the state variables stored in the training data set, and a function updating unit 5 which, based on the reward, updates a function for adjusting the current gain parameters from the present state variables. For example, the reward may be increased when at least one of the following conditions is satisfied: the overshoot is small; the undershoot is small; and the rise time is short, as illustrated in FIG. 2B.

Figure 4A:
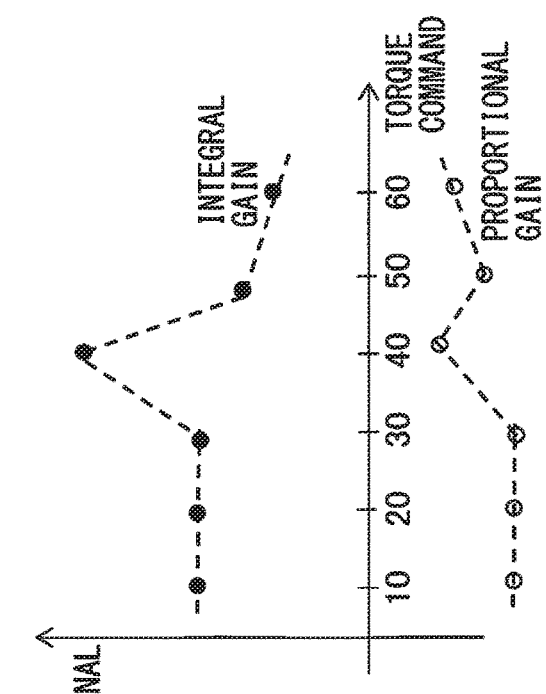
FIG. 4A is a graph depicting the relationship between a current gain parameter (integral gain, proportional gain) and a torque command when an integral gain function decreases monotonically and a proportional gain function increases monotonically as the torque command increases.
Figure 4B:
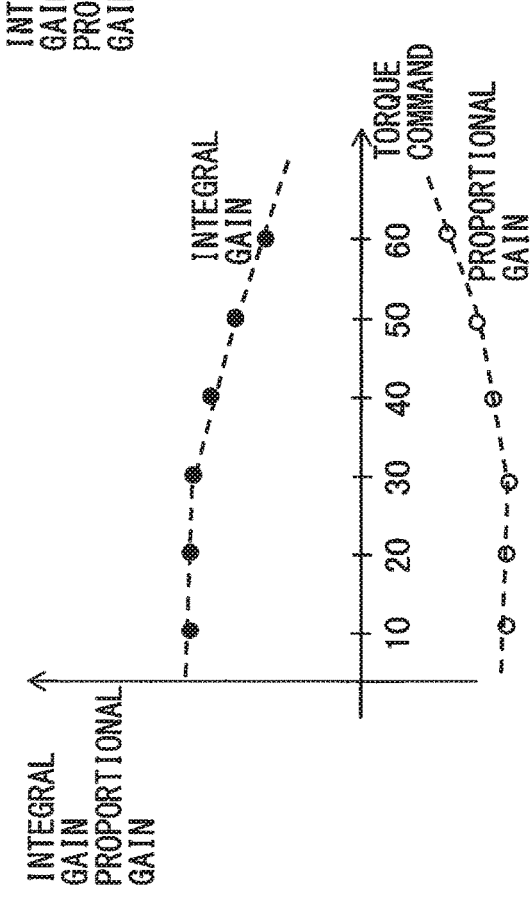
FIG. 4B is a graph depicting the relationship between the current gain parameter (integral gain, proportional gain) and the torque command when the integral gain function or proportional gain function after learning changes abruptly in response to an increase or decrease of the torque command.

However, when the integral gain function or proportional gain function after learning changes abruptly in response to an increase or decrease of the torque command, for example, as shown in FIG. 4B, the abrupt change can lead to undesirable noise, etc. even if the responsiveness is good. Therefore, in this case, it is preferable to decrease the reward.

Preferably, the machine learning apparatus 1' according to the alternative embodiment of the present invention further comprises a reward calculating unit 4' which calculates a reward based on the amplitude ratio and the amount of phase delay selected from among the state variables stored in the training data set, and a function updating unit 5' which, based on the reward, updates a function for adjusting the current gain parameters from the present state variables.

If the response is too high, it tends to easily oscillate when subjected to a disturbance. Therefore, a decision as to whether to increase or decrease the reward may be made based on a margin allowed for oscillations. More specifically, it may be verified whether or not the step response oscillates, for example, when the integral gain is doubled while holding the proportional gain fixed, and whether or not the amplitude ratio of the frequency response exceeds an allowable value (this is also interpreted as the occurrence of oscillations). Then, if the response does not oscillate, the reward may be increased by determining that the margin is sufficient; on the other hand, if the response oscillates, the reward may be decreased by determining that the margin is insufficient.

In view of the above, in the machine learning apparatus 1, 1', the reward calculating unit 4, 4' may be configured to calculate the reward further based on the margin allowed for electric current oscillations.

It will also be noted that normally the integral gain function decreases monotonically and the proportional gain increases monotonically as the torque command increases, as shown in FIG. 4A. In view of this, if the slope of the integral gain function becomes positive or decreases below a threshold value, the reward may be decreased, and if the slope of the proportional gain function becomes negative or exceeds a threshold value, the reward may be decreased.

In view of the above, in the machine learning apparatus 1, 1', the reward calculating unit 4, 4' may be configured to calculate the reward further based on the slope of the integral gain function and the slope of the proportional gain.

Preferably, the function updating unit 5, 5' performs reinforcement learning using the so-called Q-learning. Q-learning is a method of learning a value (action value) Q (s, a) for selecting an action "a" under a given state (environment) "s". That is, under a given state (environment) "s", an action "a" with the highest Q (s, a) is selected as the optimum action. The function updating unit 5, 5' updates the function (action value function Q ($s_t$, $a_t$)) in accordance with the following formula (1).

$$Q(s_t, a_t) \leftarrow Q(s_t, a_t) + \alpha\left(r_{t+1} + \gamma \max_a Q(s_{t+1}, a) - Q(s_t, a_t)\right) \quad (1)$$

where Q ($s_t$, $a_t$) is the action value function, $s_t$ is the state (environment) at time t, $a_t$ is the action at time t, $\alpha$ is the learning coefficient, $r_{t+1}$ is the reward, and $\gamma$ is the discount factor. The action value function is the expected value of the reward. The term with max is formed by multiplying the Q value of the action "a" by $\gamma$ when the action "a" with the highest Q value was selected under the state (environment) $s_{t+1}$.

It is known that the learning coefficient and the discount factor are set within the range defined by 0<$\alpha$, $\gamma$≤1; if it is assumed here for simplicity that the learning coefficient and the discount factor are both set to 1, the following formula (2) is given.

$$Q(s_t, a_t) \leftarrow r_{t+1} + \gamma \max_a Q(s_{t+1}, a) \quad (2)$$

This update formula indicates that if the value Q ($s_{t+1}$, max $a_{t+1}$) of the best action under the next state of the environment determined by the present action "a" is larger than the value Q ($s_t$, $a_t$) of the action under the present state (environment), then Q ($s_t$, $a_t$) is increased, and conversely, if it is smaller, then Q ($s_t$, $a_t$) is decreased. That is, the value of a given action under a given state (environment) is brought closer to the value of the best action in the next state determined by that given action.

In the present embodiment, a Δ integral gain function and a Δ proportional gain function, which respectively represent the amounts by which the integral gain function and the proportional gain function corresponding to the state (environment) among the state variables stored in the training data set respectively change, are determined, and a new integral gain function and a new proportional gain function are set based on the Δ integral gain function and the Δ proportional gain function, respectively; this corresponds to an action. The learning unit 3, 3' updates a table of ((integral gain function, proportional gain function), (Δ integral gain function, Δ proportional gain function), action value Q) (hereinafter called the "action value table") through learning using rewards.

The electrical machine control apparatus 7 according to the embodiment of the present invention comprises the machine learning apparatus 1, 1' and a motor controller 6. The electrical machine controller 6 includes a torque command input unit 8 which inputs a torque command. The machine learning apparatus 1, 1' includes a decision making unit 9 which makes a decision to alter the integral gain function and the proportional gain function in response to an input of the present state (environment), based on the result of the learning that the learning unit 3, 3' performed in accordance with the training data set.

The decision making unit 9 may be configured so that an action (Δ integral gain function, Δ proportional gain function) that increases the action value Q is selected with a probability of 1–ε and randomly selected with a probability of ε (ε-greedy method).

The initial value of the action value stored in the action value table may be calculated from the inductance value and the winding resistance value of the motor. Usually, the initial value of the action value stored in the action value table at the start of learning is a random value. Therefore, the learning efficiency can be enhanced by acquiring the inductance and winding resistance of the motor and appropriately providing the initial value.

If all the action values are stored in form of a table, and it is difficult to successively update them, the action value Q may be updated by using Q-learning in combination with deep learning that uses a multi-layer neural network. It is known that deep learning is an effective means for reducing the enormous amount of computation involved with Q-learning.

As shown in FIG. 3, the state in the motor controller 6 comprises two states, the state that changes indirectly with action and the state that changes directly with action. The state that changes indirectly with action includes the amount of overshoot, the amount of undershoot, and the rise time per step. The state that changes directly with action includes the integral gain function and the proportional gain function.

The learning unit 3, 3' is configured to perform an update by relearning the conditions in accordance with an additional training data set constructed from the present state variables.

The machine learning apparatus 1, 1' may be connected to the motor controller 6 via a network, and the state observing unit 2, 2' may be configured to acquire the present state variables via the network.

Preferably, the machine learning apparatus 1, 1' resides in a cloud server.

The electrical machine controller 6 incorporates the torque command input unit 8 (torque step commanding device). The state observing unit 2, 2' includes a current sensor 21 and a communication means 22 for acquiring the integral gain function and the proportional gain function. The machine learning apparatus 1, 1' may be incorporated into the motor controller 6.

Figure 5:
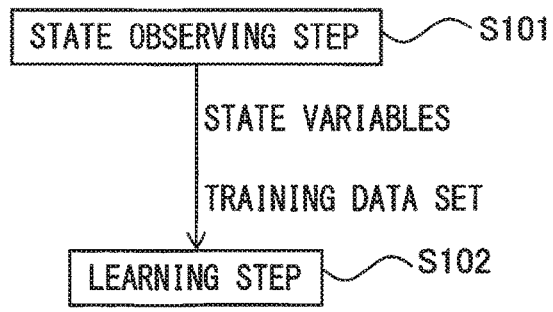
FIG. 5 is a flowchart for explaining the sequence of operations performed by the machine learning apparatus according to the embodiment of the present invention.

Next, a machine learning method according to an embodiment of the present invention will be described. FIG. 5 shows a flowchart for explaining the sequence of operations performed by the machine learning apparatus according to the embodiment of the present invention. The machine learning method according to the embodiment of the present invention is a machine learning method for learning the conditions associated with the adjustment of current gain parameters in electrical machine control, and comprises acquiring actual current as well as an integral gain function and a proportional gain function in a current control loop, observing state variables which include the integral gain function, the proportional gain function, and at least one of the amount of overshoot, the amount of undershoot, and the rise time of the actual current occurring in response to a step-like torque command, and learning the conditions associated with the adjustment of the current gain parameters in accordance with a training data set constructed from the state variables.

A machine learning method according to an alternative embodiment of the present invention is a machine learning method for learning the conditions associated with the adjustment of current gain parameters in electrical machine control, and comprises acquiring actual current as well as an integral gain function and a proportional gain function in a current control loop, observing state variables which include the integral gain function, the proportional gain function, and at least one of bandwidth times calculated from the amplitude ratio and the amount of phase delay of the actual current occurring in response to a torque command constructed from a set of sinusoidal waves of different frequencies, and learning the conditions associated with the adjustment of the current gain parameters in accordance with a training data set constructed from the state variables.

FIG. 5 shows a flowchart for explaining the sequence of operations performed by the machine learning apparatus according to the embodiment of the present invention. First, in step S101, the apparatus acquires the actual current as well as the integral gain function and the proportional gain function in the current control loop and observes state variables which include the integral gain function, the proportional gain function, and at least one of the amount of overshoot, the amount of undershoot, and the rise time of the actual current occurring in response to a step-like torque command. Alternatively, in step S101, the apparatus may acquire the actual current as well as the integral gain function and the proportional gain function in the current control loop and observe state variables which include the integral gain function, the proportional gain function, and at least one of bandwidth times calculated from the amplitude ratio and the amount of phase delay of the actual current occurring in response to a torque command constructed from a set of sinusoidal waves of different frequencies.

Next, in step S102, the apparatus learns the conditions associated with the adjustment of the current gain parameters in accordance with the training data set constructed from the state variables.

Figure 6:
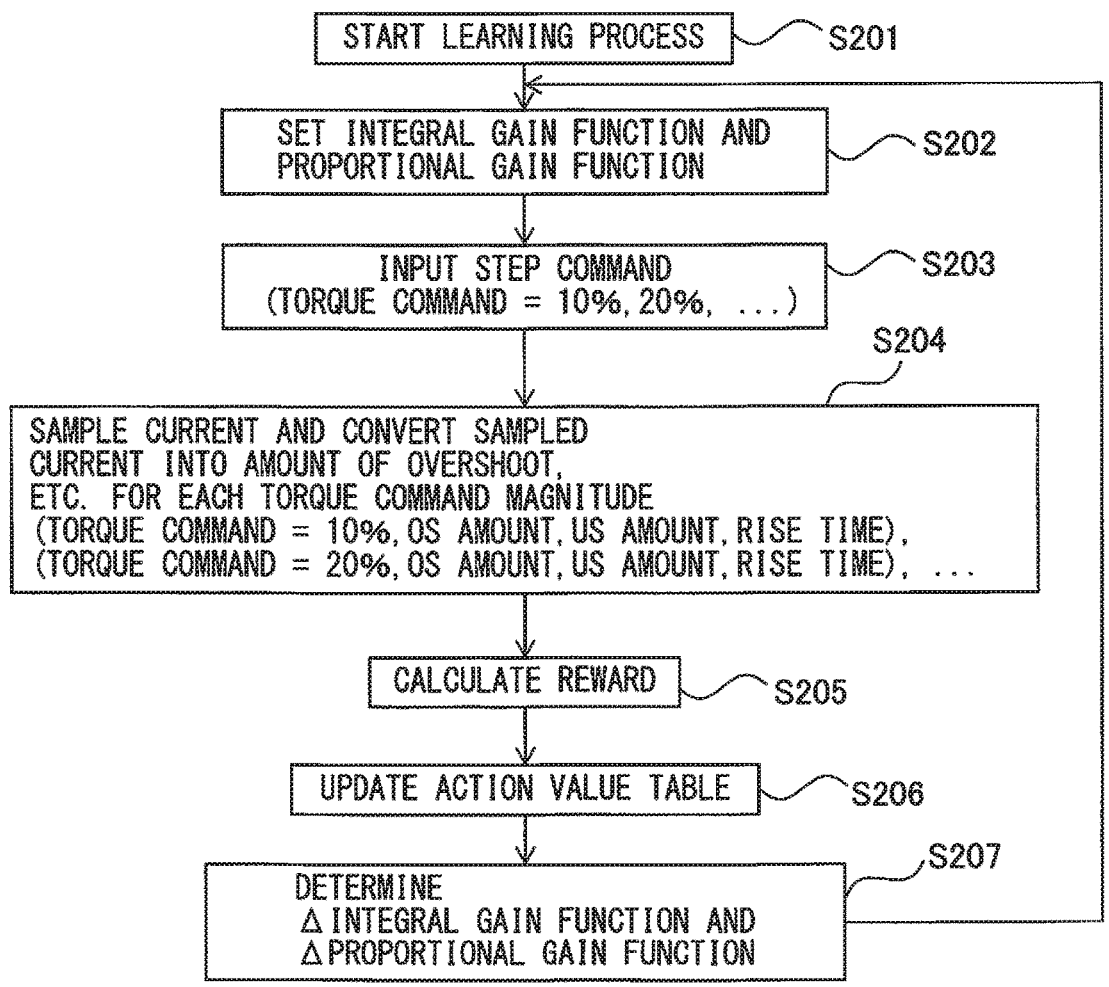
FIG. 6 is a flowchart for explaining the sequence of operations performed by the motor control apparatus according to the embodiment of the present invention.

Next, a machine learning method that uses a motor drive system comprising the motor control apparatus according to the embodiment of the present invention will be described. FIG. 6 shows a flowchart for explaining the sequence of operations performed by the motor control apparatus according to the embodiment of the present invention. First, in step S201, the learning process is started.

Next, in step S202, the integral gain function and the proportional gain function are set.

In step S203, a step command is input. More specifically, the torque command is input by incrementally increasing its magnitude, for example, 10% first, then 20%, and so on.

Next, in step S204, the current is sampled and converted into the amount of overshoot, etc. for each torque command magnitude. For example, by increasing the torque command magnitude in increments of 10%, the sampled current is converted into the amount of overshoot (OS amount), the amount of undershoot (US amount), and the rise time occurring in response to the input torque command.

In step S205, the reward is calculated. The reward determined here is not necessarily limited to 0 or 1. That is, the reward is calculated using a function that monotonically decreases with the amount of overshoot, a function that monotonically increases with the amount of undershoot, and a function that monotonically decreases with the rise time. For example, one reward may be given for the entire set of the integral gain function and the proportional gain function, or alternatively, one reward may be given for each step size. That is, the difference is that the integral gain function and the proportional gain function are optimized as functions or the integral gain and proportional gain for each torque command are individually optimized. More specifically, if there are ten steps in increments of 10%, then ten kinds of rewards may be increased or decreased.

Next, in step S206, the action value table is updated.

Finally, in step S207, the Δ integral gain function and the Δ proportional gain function are determined based on the updated action value table. By repeating the above steps S202 to S207, the integral gain function and the proportional gain function can be optimized.

While the above description has been given by dealing with an example that uses the gain parameters of the current loop, essentially the same process can be applied to the gain parameters of a speed loop. In that case, however, the torque command should be replaced with a speed command.

As has been described above, according to the machine learning apparatus, the motor control apparatus equipped with the machine learning apparatus, and the machine learning method according to the embodiment of the present invention, by optimizing the current gain parameters accounting for the differences between each individual motor, it becomes possible to improve motor response, reduce unevenness in feed, and enhance accuracy, and to reduce the number of adjustment steps.

Thus, the present invention can achieve a machine learning apparatus that can improve motor response, reduce unevenness in feed, and enhance accuracy by optimizing the current gain parameters through machine learning, and also achieve a motor control apparatus equipped with such a machine learning apparatus, and a machine learning method for the same.

The invention claimed is:

1. A machine learning apparatus for learning a condition associated with adjustment of a current gain parameter in electrical machine control, the apparatus comprising:
a state observing unit comprising a current sensor configured to acquire actual current of a motor, the state observing unit configured to
acquire an integral gain function and a proportional gain function in a current control loop of the motor, and
detect state variables which include the integral gain function,
the proportional gain function, and
at least one of an amount of overshoot, an amount of undershoot, and a rise time of the actual current occurring in response to a stepwise torque command; and
a learning unit configured to learn the condition associated with the adjustment of the current gain parameter in accordance with a training data set constructed from the state variables,
wherein the machine learning apparatus is configured to apply a result of the learned condition based on the integral gain function and the proportional gain function to control the motor in accordance with the result of the learned condition.

2. The machine learning apparatus according to claim 1, wherein the learning unit is configured to learn the condition in accordance with the training data set which is acquired for a plurality of electrical machines.

3. The machine learning apparatus according to claim 1, further comprising:
a reward calculating unit configured to calculate a reward based on the amount of overshoot, the amount of undershoot, and the rise time; and
a function updating unit configured to, based on the reward, update a function for adjusting the current gain parameter from a present state variable.

4. The machine learning apparatus according to claim 3, wherein the reward calculating unit is configured to calculate the reward further based on a slope of the integral gain function and a slope of the proportional gain function.

5. The machine learning apparatus according to claim 3, wherein the function updating unit is configured to perform reinforcement learning using Q-learning and use deep learning to update an action value in the Q-learning.

6. A machine learning apparatus for learning a condition associated with adjustment of a current gain parameter in electrical machine control, the apparatus comprising:
a state observing unit comprising a current sensor configured to acquire actual current of a motor, the state observing unit configured to
acquire an integral gain function and a proportional gain function in a current control loop of the motor, and
detect state variables which include
the integral gain function,
the proportional gain function, and
at least one of bandwidth times calculated from an amplitude ratio and an amount of phase delay of the actual current occurring in response to a torque command constructed from a set of sinusoidal waves of different frequencies; and
a learning unit configured to learn the condition associated with the adjustment of the current gain parameter in accordance with a training data set constructed from the state variables,
wherein the machine learning apparatus is configured to apply a result of the learned condition based on the integral gain function and the proportional gain function to control the motor in accordance with the result of the learned condition.

7. The machine learning apparatus according to claim 6, further comprising:
a reward calculating unit configured to calculate a reward based on the amplitude ratio and the amount of phase delay; and
a function updating unit configured to, based on the reward, update a function for adjusting the current gain parameter from a present state variable.

8. An electrical machine control apparatus comprising the machine learning apparatus according to claim 1 and a motor controller, wherein
the motor controller includes a torque command input unit configured to input a torque command, and
the machine learning apparatus includes a decision making unit configured to make a decision to alter the integral gain function and the proportional gain function in response to an input of a present state variable, based on the result of the learned condition learned by the learning unit in accordance with the training data set.

9. The electrical machine control apparatus according to claim 8, wherein the learning unit is configured to perform an update by relearning the condition in accordance with an additional training data set constructed from a combination of the present state variable, the altered integral gain function, and the altered proportional gain function.

10. The electrical machine control apparatus according to claim 8, wherein the machine learning apparatus is connected to the motor controller via a network, and the state observing unit is configured to acquire the present state variable via the network.

11. The electrical machine control apparatus according to claim 10, wherein the machine learning apparatus resides in a cloud server.

12. The electrical machine control apparatus according to claim 8, wherein the machine learning apparatus is incorporated in the motor controller.

13. A machine learning apparatus for learning a condition associated with adjustment of a speed gain parameter in electrical machine control, the apparatus comprising:
a state observing unit comprising a sensor configured to acquire actual speed of a motor, the state observing unit configured to
acquire an integral gain function and a proportional gain function in a speed control loop of the motor, and
detect state variables which include
the integral gain function,
the proportional gain function, and
at least one of bandwidth times calculated from an amplitude ratio and
an amount of phase delay of the actual speed occurring in response to a speed command constructed from a set of sinusoidal waves of different frequencies; and
a learning unit configured to learn the condition associated with the adjustment of the speed gain parameter in accordance with a training data set constructed from the state variables,
wherein the machine learning apparatus is configured to apply a result of the learned condition based on the integral gain function and proportional gain function to control the motor in accordance with the result of the learned condition.

14. The machine learning apparatus according to claim 13, further comprising:
a reward calculating unit configured to calculate a reward based on the amplitude ratio and the amount of phase delay; and
a function updating unit configured to, based on the reward, update a function for adjusting the speed gain parameter from a present state variable.

15. A machine learning apparatus for learning a condition associated with adjustment of a speed gain parameter in electrical machine control, the apparatus comprising:
  a state observing unit comprising a sensor configured to acquire actual speed of a motor, the state observing unit configured to
    acquire an integral gain function and a proportional gain function in a speed control loop of the motor, and
    detect state variables which include
      the integral gain function,
      the proportional gain function, and at least one of an amount of overshoot,
      an amount of undershoot, and
      a rise time of the actual speed occurring in response to a stepwise speed command; and
  a learning unit configured to learn the condition associated with the adjustment of the speed gain parameter in accordance with a training data set constructed from the state variables,
  wherein the machine learning apparatus is configured to apply a result of the learned condition based on the integral gain function and proportional gain function to control the motor in accordance with the result of the learned condition.

16. The machine learning apparatus according to claim 15, wherein the learning unit is configured to learn the condition in accordance with the training data set which is acquired for a plurality of electrical machines.

17. The machine learning apparatus according to claim 15, further comprising:
  a reward calculating unit configured to calculate a reward based on the amount of overshoot, the amount of undershoot, and the rise time; and
  a function updating unit configured to, based on the reward, update a function for adjusting the speed gain parameter from a present state variable.

18. The machine learning apparatus according to claim 17, wherein the reward calculating unit is configured to calculate the reward further based on a slope of the integral gain function and a slope of the proportional gain function.

19. The machine learning apparatus according to claim 17, wherein the function updating unit is configured to perform reinforcement learning using Q-learning and use deep learning to update an action value in the Q-learning.

20. An electrical machine control apparatus comprising the machine learning apparatus according to claim 15 and a motor controller, wherein
  the motor controller includes a speed command input unit configured to input a speed command, and
  the machine learning apparatus includes a decision making unit configured to make a decision to alter the integral gain function and the proportional gain function in response to an input of a present state variable, based on a result of the learning that the learning unit performed in accordance with the training data set.

21. The electrical machine control apparatus according to claim 20, wherein the learning unit is configured to perform an update by relearning the condition in accordance with an additional training data set constructed from a combination of the present state variable, the altered integral gain function, and the altered proportional gain function.

22. The electrical machine control apparatus according to claim 20, wherein the machine learning apparatus is connected to the motor controller via a network, and the state observing unit is configured to acquire the present state variable via the network.

23. The electrical machine control apparatus according to claim 22, wherein the machine learning apparatus resides in a cloud server.

24. The electrical machine control apparatus according to claim 20, wherein the machine learning apparatus is incorporated in the motor controller.

* * * * *